(12) United States Patent
Sorensen et al.

(10) Patent No.: US 8,310,075 B2
(45) Date of Patent: Nov. 13, 2012

(54) SHADOW CONTROL OF WIND TURBINES

(75) Inventors: Lindy B. Sorensen, Tarm (DK); Bo Heftholm Christensen, Silkeborg (DK); Bruno Lund Mathiasen, Videbaek (DK)

(73) Assignee: Vestas Wind Systems A/S, Aarhus N, (DK)

( * ) Notice: Subject to any disclaimer, the term of this patent is extended or adjusted under 35 U.S.C. 154(b) by 337 days.

(21) Appl. No.: 12/674,563

(22) PCT Filed: Sep. 3, 2007

(86) PCT No.: PCT/EP2007/007683
§ 371 (c)(1),
(2), (4) Date: Feb. 22, 2010

(87) PCT Pub. No.: WO2009/030252
PCT Pub. Date: Mar. 12, 2009

(65) Prior Publication Data
US 2011/0204629 A1 Aug. 25, 2011

(51) Int. Cl.
*F03D 9/00* (2006.01)
*H02P 9/04* (2006.01)
(52) U.S. Cl. .......................................................... 290/44
(58) Field of Classification Search .................... 290/44, 290/43, 55
See application file for complete search history.

(56) References Cited

U.S. PATENT DOCUMENTS

| 6,661,111 | B1 | 12/2003 | Wobben |
| 7,619,321 | B2* | 11/2009 | Wobben ........................ 290/55 |
| 2006/0267347 | A1 | 11/2006 | Wobben |

FOREIGN PATENT DOCUMENTS

| DE | 19928048 A1 | 12/1999 |
| DE | 102005007471 A1 | 8/2006 |
| JP | 2003035248 | 2/2003 |

OTHER PUBLICATIONS

E. Verkuijlen, C.A. Westra, Shadow Hindrance by Wind Turbines, European Wind Energy Conference, Hamburg, Germany, Oct. 22, 1984, pp. 356-361.
International Search Report in corresponding PCT/EP2007/007683, 3 pages.

* cited by examiner

*Primary Examiner* — Javaid Nasri
(74) *Attorney, Agent, or Firm* — Patterson & Sheridan, LLP

(57) ABSTRACT

A rotor of a wind turbine may cast an intermittent shadow onto an object in the vicinity of the turbine. A shadow-control system stops the wind turbine, based on a shadow-related shut-down condition. The condition is based on a result of a comparison between a direct-light intensity and an indirect-light intensity being beyond a direct-to-indirect light threshold. A set of light sensors measures the direct- and indirect-light intensities. A sensor measures the direct light intensity when irradiated by the sun, and the indirect-light intensity when not irradiated by the sun. The set of light sensors to provide the measured direct- and indirect-light intensities for the comparison consists of two sensors, an eastward-oriented sensor and a westward-oriented sensor.

15 Claims, 6 Drawing Sheets

SHADOW CONTROL OF WIND TURBINES

FIELD OF THE INVENTION

The present invention relates generally to shadow control of wind turbines and, for example, to a shadow-control system of a wind turbine, wherein the wind turbine has a rotor that, when rotating and when the sun is at a certain position, may cast an intermittent shadow onto an object in the vicinity of the turbine; the shadow control system is arranged to cause the wind turbine to be stopped, based on a shadow-related shut-down condition, so that intermittent shadow is not cast onto the object.

BACKGROUND OF THE INVENTION

The rotor of a wind turbine, as it rotates, may cast an intermittent shadow on the adjacent ground area. Residents living in this area often perceive such intermittent shadow as a nuisance. This problem might make it difficult to erect or operate wind turbines close to objects that are "sensitive" to intermittent shadow, such as occupied houses.

In this context, it was proposed in DE 199 28 048 A1 that a wind turbine be shut down when a shadow-sensitive object (e.g. a house) close to the wind turbine can be subjected to intermittent shadow produced by the wind turbine's rotor. The shut-down condition is comprised of two sub-conditions logically combined by an AND: the first sub-condition is that the current position of the sun is such that shadow can theoretically be cast onto the object. The second sub-condition pertains to the "quality and quantity" of the shadow, i.e. whether the sun's light radiation is such that shadow will actually occur. The second sub-condition is based on a measurement of direct- and indirect-light intensities and a result of a comparison of these intensities being above a given threshold.

A similar shadow control is described in U.S. Pat. No. 6,661,111. The shut-down condition is, however, based only on a direct-light measurement, and whether the measured direct-light intensity is above a threshold. When the condition mentioned is fulfilled, the turbine is not shut down instantly, but only after a delay of, e.g., five minutes (such a delay could be regarded as a third sub-condition that is "ANDed" with the other sub-conditions mentioned). If the turbine has been stopped, but the shut-down condition is not fulfilled any more (e.g. because the sun has moved so that no shadow can be cast onto the object anymore, or the measured intensity has fallen below the threshold), the operation of the wind turbine is resumed. Again, operation is not resumed instantly, but only after a delay of, e.g., two minutes. The delays prevent the turbine from being switched on and off too frequently, e.g. if the light intensity fluctuates around the threshold.

US 2006/0267347 A1 pertains to a shadow-control system similar to that of DE 199 28 048 A1. To measure the direct- and indirect-light intensities, three light sensors are provided. They are arranged at relative angles of 120°, and their aperture angle (i.e. their light sensitive opening angle) is at least 120° to ensure that always at least one of the sensors always picks up the direct rays of sunlight and at least another one is not exposed to the direct rays of sunlight.

SUMMARY OF THE INVENTION

A first aspect of the invention is directed to a shadow-control system of a wind turbine, the wind turbine having a rotor that, when rotating and when the sun is at a certain position, may cast an intermittent shadow onto an object in the vicinity of the turbine. The shadow-control system is arranged to cause the wind turbine to be stopped, based on a shadow-related shut-down condition, so that intermittent shadow is not cast onto the object. The shut-down condition comprises a result of a comparison between a direct-light intensity and an indirect-light intensity being beyond a direct-to-indirect light threshold. The shadow-control further comprises a set of light sensors to provide measured direct- and indirect-light intensities for the purpose of comparison, the light sensors being able to measure the direct-light intensity when irradiated by the sun and the indirect-light intensity when not irradiated by the sun. The set of light sensors which provides measured direct- and indirect-light intensities for the comparison has only two light sensors, an eastward-oriented light sensor and a westward-oriented light sensor.

According to another, independent aspect, a shadow control system of a wind turbine is provided. The wind turbine has a rotor that, when rotating and when the sun is at a certain position, may cast an intermittent shadow onto an object in the vicinity of the turbine. The shadow control system is arranged to cause the wind turbine to be stopped, based on a shadow-related shut-down condition, so that intermittent shadow is not cast onto the object. The shadow control system is also arranged to cause the operation of the wind turbine to be resumed, on the basis of a shadow-related operation-resume condition. The shut-down condition comprises a light-measurement result being beyond a first threshold, and the operation-resume condition comprises a light-measurement result returning to a second threshold. There is a hysteresis in the thresholds such that the light-measurement result causing shut-down is not sufficient to cause the operation to be resumed.

According to another, independent aspect, a shadow control system of a wind turbine is provided. The wind turbine has a rotor that, when rotating and when the sun is at a certain position, may cast an intermittent shadow onto an object in the vicinity of the turbine. The shadow control system is arranged to cause the wind turbine to be stopped, based on a shadow-related shut-down condition, so that intermittent shadow is not cast onto the object. The shut-down condition comprises that a light-measurement result is above a threshold. At least one light sensor is provided to measure light intensity. The response of the at least one light sensor is temperature-dependent. The shadow control-system comprises at least one temperature-measurement device, or is arranged to receive a temperature-measurement signal. The light sensor signal is temperature-compensated, based on the measured temperature.

According to another, independent aspect, a shadow control system of a wind turbine is provided. The wind turbine has a rotor that, when rotating and when the sun is at a certain position, may cast an intermittent shadow onto an object in the vicinity of the turbine. The shadow control system is arranged to cause the wind turbine to be stopped, based on a shadow-related shut-down condition, so that intermittent shadow is not cast onto the object. The shut-down condition comprises that a light-measurement result is above a threshold. At least one light sensor is provided to measure light intensity. The at least one light sensor is equipped with a heating device to keep the sensor free of ice.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
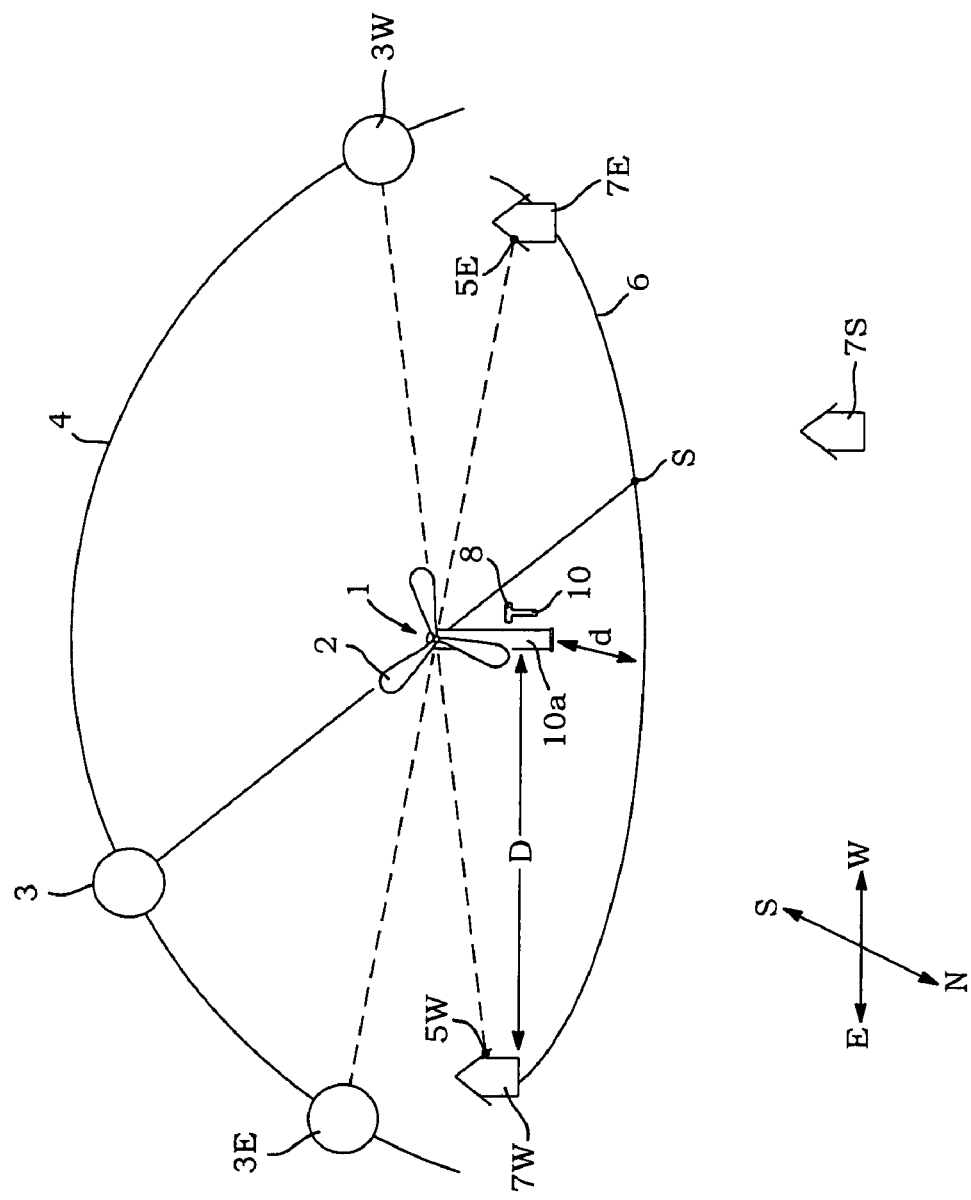
FIG. 1 is an illustration of the overall situation of shadow cast by a wind turbine during a day.

FIG. 1 is an illustration of the overall situation of shadow cast by a wind turbine. Before proceeding further with the detailed description of FIG. 1, however, a few items of the embodiments will be discussed.

The embodiments pertain to wind turbines having a rotor that, when rotating and when the sun is at a certain position, may cast an intermittent shadow onto an object in the vicinity of turbine. The wind turbines are equipped with a shadow control system arranged to cause the turbines to be stopped, based on a shadow-related shut-down condition, so that such intermittent shadow is not cast onto the object. The shut-down condition may be composed as a logical combination of a plurality of sub-conditions. In some of the embodiments, a first sub-condition is whether the current position of the sun is such that shadow can theoretically be cast onto the "shadow-sensitive" object. In some embodiments, this is determined as a result of an on-the-fly calculation of the sun's current position and of where the turbine's rotor will cast shadow and whether this shadow will be cast on the shadow-sensitive object. In other embodiments, the sun's position, or the position of the rotor shadow produced, is predetermined (e.g. pre-calculated) and stored in a table as a function of the date and time, and is read out from the table rather than being calculated on the fly. In still further embodiments, the result of the comparison, i.e. whether intermittent shadow is cast on the shadow-sensitive object, or not, is predetermined (e.g. pre-calculated) and stored in a table as a function of the date and time. In the latter embodiments, for example, the shadow controller periodically reads out the "yes/no" (or "true/false") value stored in the table that relates to the current date and time.

A further sub-condition pertains to the quality and quantity of the shadow, i.e. whether the current sun radiation is such that shadow will actually occur. For example, when the weather is cloudy or misty, the sun radiation will be diffuse (i.e. the light will come from different directions), so that the rotor will produce no pronounced shadow. Such "half shadow" is not, or not very clearly visible, so that shut-down of the wind turbine in such circumstances is generally not required. The shadow quality and quantity can be quantified by a comparison of the direct- and indirect-light intensities: if they are very different, there will be pronounced shadow, but if they are similar, there will be no shadow, or only half shadow. In the embodiments, a second shut-down condition is therefore based on a measurement of the direct-light and indirect-light intensities, and whether the result of a comparison of them is beyond a direct-to-indirect light threshold. If both sub-conditions are fulfilled, the shadow-control system causes the wind turbine to be shut down. The two sub-conditions mentioned are not exclusive; for example, in some embodiments an additional third sub-condition is the result of the direct-light intensity being above a direct-light threshold. Furthermore, in some embodiments, there are delay-related sub-conditions, i.e. the shut-down is not initiated instantly if the other conditions are fulfilled, but only after a certain delay.

There are different embodiments of how the comparison of the direct- and indirect-light intensities is made: in some embodiments, "comparing" consists of (or comprises) determining the difference between the direct-light intensity and the indirect-light intensity, which normally results in a positive value. Alternatively, "comparing" consists of (or comprises) determining the reversed difference (i.e. the difference between the indirect- and the direct-light intensities), which normally results in a negative value. In other embodiments, "comparing" consists of (or comprises) determining the ratio between the direct-light intensity and the indirect-light intensity, normally resulting in a positive value greater than or equal to 1 or, inversely, the ratio between the indirect- and the direct-light intensity, normally resulting in a positive value smaller than or equal to 1.

The magnitude and the nature of the direct-to-indirect light threshold (i.e. the meaning of "beyond the threshold") is adapted to the manner in which the direct- and indirect-light intensities are compared: in the first case mentioned (difference between direct- and indirect-light intensity), the turbine will be shut down if the result is greater than the threshold (provided, of course, that the other sub-condition(s) is/are fulfilled). In the second case mentioned (difference between indirect- and direct-light intensity) the turbine is shut-down if the (negative) result value falls below the threshold. In the third case mentioned (ratio between direct- and indirect-light intensity), the turbine is shut-down if the ratio is above a certain (positive) threshold. Finally, in the fourth case (ratio between indirect- and direct-light intensity) the turbine is shut-down if the result falls below a (positive) threshold. On a clear day the direct-light intensity may go up to about 100,000 Lux (depending, of course, on certain parameters, such as the latitude of the turbine's position, the season, etc), and on a cloudy day it would typically only go up to about 20,000 Lux. A typical shadow light intensity may be 10,000 Lux. Exemplary values of the direct- to indirect-light threshold may be, for the first case: 5,000 Lux, for the second case: −5,000 Lux, for the third case: 1.33, and for the fourth case: 0.75 (of course, these threshold values are only illustrative, actually the choice of a specific threshold value will also depend on the latitude of the turbine's position, on administrative and legal rules, on agreements between wind turbine owners and residents who may be subjected to intermittent shadow, etc.).

In some of the embodiments, the light sensors, although measuring different entities (the direct- or the indirect-light intensity), actually have the same sensor configuration and type, and each of them can measure the direct-light intensity when facing the sun (and therefore being irradiated by the sun) or the indirect-light intensity when not facing the sun (and therefore not being irradiated by the sun). Since the sun moves, the two sensors may interchange their roles: at a certain time of the day, for example, a first sensor will be facing the sun and take the role of the direct-light sensor, while a second sensor then not facing the sun will take the role of the indirect-light sensor; at a later time of the day, when the sun has moved, the second sensor may be facing the sun and then taking the role of the direct-light sensor, while the first sensor—which is not facing the sun anymore—will then take the role of the indirect-light sensor.

Normally, shadow-sensitive objects are not positioned within a certain minimum distance from a wind turbine. Consequently, the rotor's intermittent shadow will typically only hit shadow-sensitive objects when the sun's elevation angle is small. It has been recognised that disturbing shadow will typically only hit shadow-sensitive objects in the mornings or the evenings (because only at these times is the sun's elevation angle small). Based on that, it has further been recognised that it is not necessary to have complete sensor coverage extending over 360° (nor 180°), but a sensor coverage is sufficient consisting of two sectors, an east sector and a west sector. In the morning, the east sensor will be facing the sun and take the role of the direct-light sensor, while the second sensor then not facing the sun will take the role of the indirect-light sensor; in the evening, these roles are reversed. At other times of the day, such a "lean" sensor arrangement would not be able to determine the quantity and quality of shadow but, since no shadow-sensitive objects will be affected, no such determination is actually required at these times. Accordingly, in the embodiments, a set of light sensors is provided to measure the direct- and indirect-light intensities for the comparison of intensities that has only two sensors, an eastward-oriented sensor and a westward-oriented sensor[1].

[1] Only in special circumstances may this lean sensor arrangement not be sufficient to always determine the shadow quality and quantity, when needed, e.g. in the case of a wind turbine at a latitude far in the north, during the winter, the sun's biggest elevation angle may be so small that disturbing shadow may also be produced when the sun is in the south. For such specific cases, a third sensor (e.g. a southward sensor may be provided, when the wind turbine is on the northern hemisphere). This is, however, not the subject of the present application.

In some embodiments, the assignment of the roles to the light sensors is explicit, for example corresponding to the current time of day. In the mornings, the signal provided by the eastward-oriented sensor will be regarded as representative of the direct-light intensity, and the westward-oriented sensor as representative of the indirect-light intensity; in the evenings, this assignment will be reversed. In other embodiments, however, there is a sort of implicit dynamic assignment, simply based on the measurement results: the greater intensity signal is considered to be representative of the direct-light intensity, and the smaller signal is considered to be representative of the indirect-light intensity, irrespective of the time of day, or other parameters. As will be explained below, this can be handled in a mathematically simple way by calculating the absolute value of the difference of the two signals.

The light sensors have an aperture angle (i.e. they are sensitive to light sources originating from a certain angular range). In some embodiments, the light sensors are oriented such that the eastern and western directions are within the aperture angle of the eastward- and westward-oriented light sensors, respectively.

In some embodiments, the axes of the light sensors are aligned directly to east and west. In alternative embodiments, the axes are aligned eastward and westward, however, with a component towards the southward direction (this applies, for example, to a wind turbines installed on the northern hemisphere—if the turbine is installed on the southern hemisphere, in the alternative embodiments mentioned the axes are aligned eastward and westward, however, with a component towards the northward direction). Although not mandatory, the axes of the light sensors are preferably oriented symmetrically with respect to the southern/northern direction.

Since it has been recognised that it is often sufficient to perform shadow control of this kind only in the mornings and the evenings, no complete coverage of 180° (east-south-west on the northern hemisphere, or east-north-west on the southern hemisphere) is actually required. Rather, in some embodiments, the light sensors have an aperture angle smaller than 90°, and the light sensors are oriented such that their combined aperture angle does not completely cover the angular range between them that includes the southern direction (on the northern hemisphere; this range is also called the "including-south range"), or the northern direction (on the southern hemisphere; this range is also called the "including-north range").

In a simple form of a shadow control system for wind turbines (which would not be according to this invention) a light sensor could be mounted on each shadow-sensitive object, and if one of the sensors detected intermittent shadow it could cause the wind turbine to be stopped. However, this would require sensors to be mounted on all the shadow-sensitive objects, and connected over considerable distances to a central wind-turbine controller.

By contrast, the "centralised" shadow-control system according to the invention obviates the need to have one sensor for each object and relatively long signal lines to transmit all the sensor signals. The "centralised" sensor set (consisting of the eastward- and the westward-oriented sensor) can be mounted at any location that is representative of the light conditions at the wind turbine's position (i.e. not too far from the wind turbine) and at which no other object can cast shadow on it (for example, the sensor set should not be mounted westward or eastward of an object that could cast shadow on the sensor set in the mornings or evenings). For example, in some of the embodiments, the sensor set is mounted on a pole of a few meters height and a few meters southward (on the northern hemisphere) or northward (on the southern hemisphere) of the wind turbine's tower.

In other embodiments, the sensor set is directly mounted on the wind turbine's tower, e.g. at a height of a few meters, where the rotor cannot cast shadow on the tower. The eastward-oriented and the westward-oriented sensors are mounted on the east side and the west side of the tower, respectively.

Nowadays, a number of wind turbines are often grouped together to form a wind park, e.g. having a common point of coupling to the electricity grid; some of the control functions of the wind turbines are normally also centralised and taken over by a wind park control facility. In some embodiments, the shadow control system—although it eventually causes the operation of individual wind turbines to be stopped or resumed—is partly or completely centralised for a whole wind park, or for a subset of turbines of a wind park. For example, only one centralised light-sensor set may be provided for a whole wind park. In principle, it is conceivable that all the turbines of the wind park could be shut down in unison, if one of the turbines cast shadow on a shadow-sensitive object. However, even if the shadow control is based on a single light-sensor set installed at the wind park it is preferred from an economical point of view that the individual turbines of a wind park, be individually shut down and restarted, only if the individual turbine in question casts shadow on a shadow-sensitive object in its vicinity.

The processing of the light-sensor signals may be implemented in an analogue and/or digital manner; a digital implementation can, for instance, be based on a digital signal processor. In some embodiments, the shadow control system is an integral part of the wind turbine's main control responsible for the turbine's main control functions. In other embodiments, the shadow control system is a separate module that is only linked to the wind turbine controller by communicating a few signals, such as the shadow-related shut-down and resume-operation signals.

The steps taken to actually stop the wind turbine upon receipt of such a shut-down signal are controlled by the wind turbine's main control in the usual manner, e.g. by pitching the blades into the flag position, breaking the rotor to rest, and turning the nacelle with the rotor out of the wind; during this process, the electrical connection to the electricity grid is usually also interrupted. Upon receipt of an operation-resume signal, the wind turbine's main control, in principle, performs the same steps in a reversed order (the re-connection to the electrical grid is, however, more complex because a synchronisation has to be performed etc.).

As mentioned, the shut-down decision is based on a result of a comparison between the direct- and the indirect-light intensity being beyond a direct-to-indirect light threshold. Depending on the particular threshold setting chosen by the operator, the direct-to-indirect light threshold also implies a direct-light threshold (this is because if the direct-to-indirect light threshold is set to a relatively big value, it can only be exceeded if the magnitude of the direct-light intensity is sufficient). However, if the operator sets the direct-to-indirect light threshold to a relatively small value, this threshold could also be exceeded when the absolute-light intensity is small, although shadow then cast might be acceptable. Thus, in some embodiments, a further sub-condition is added to the sub-conditions mentioned so far, namely that the result of a direct-light intensity measurement is above a direct-light threshold. The direct-light intensity may also be derived from the two-sensor set; for example, it is the maximum of the two light-intensity signals provided by the two sensors (alternatively, it is also possible to provide an additional third sensor to measure the direct-light intensity separately; however, such a third sensor would not be considered to be a part of the set of sensors delivering the signals for the comparison of the direct- and indirect-light intensities).

As mentioned at the outset, it is known in the prior art that shut-down and operation-resume delays may be introduced to render the shadow control less "nervous" and avoid too frequent operation changes. Accordingly, in some of the embodiments such delays are used (which can be considered as a further sub-condition, as explained above).

In other embodiments, however, the thresholds for shutting-down and resuming the operation of the wind turbine are not identical; rather, there is a hysteresis in these thresholds such that the value of the direct- to indirect-light intensity that just causes shut-down is not sufficient to cause the operation to be resumed; rather, the direct- to indirect-light intensity has to be greater or smaller (depending on the particular way in which the direct-to-indirect light intensity is mathematically defined) to cause the operation to be resumed. For example, if the direct- to indirect-light intensity is defined as the difference between the measured direct- and indirect-light intensities, and the corresponding direct- to indirect-light threshold for shut-down is 5,000 Lux, the corresponding threshold for operation-resumption is smaller to provide the hysteresis function, for example 2,500 Lux. This means, for example, on a cloudy day with a lot of diffuse light, if the threshold is once exceeded by the direct- to indirect-light intensity and the turbine is accordingly shut-down, and if the light becomes a bit more diffuse, and the direct-to-indirect light intensity consequently went down a bit, say to 4,000 Lux, the operation would not be resumed. Rather, the increase of diffusity has to be more significant, for example, such that the direct- to indirect-light intensity falls below the 2,500 Lux threshold.

The effect of this hysteresis solution is that the shadow control is also less nervous, but the characteristics are different from the known delay solution: while the delays are always the same, irrespective of how significantly the light conditions have changed, the hysteresis solution takes this into account. If, for instance, a change in the light intensity conditions is insignificant, the current operation of the wind turbine is not changed at all, which would correspond to a very long (even infinite) delay. If, however, a change in the light intensity conditions is significant (for example, because a cloud obscures the sun, or the like) the effective delay time is very short (it may be virtually zero). Consequently, although both solutions are similar, the hysteresis solution is considered advantageous over the delay solution since it takes the significance of an intensity change into account.

Therefore, the hysteresis solution is an invention in its own right, irrespective of whether the decisions are based on relative or absolute intensity measurements, or how the light sensor(s) is (are) configured and oriented. Accordingly, the hysteresis solution is also claimed as an independent claim that does not include certain definitions of claim 1, and in particular the definitions pertaining to the nature of the intensity measurements made and the number and orientation of the light sensors.

In some of the embodiments, the hysteresis solution and the delay solution are combined, i.e. the thresholds for shut-down and operation-resume are different, and a shut-down and/or operation-resume delay is applied on top of that. This means that a change of the light-intensity conditions must not only be a significant one, but also has to persist for a while (for example, if the turbine has been shut-down, a small cloud quickly passing the sun would not cause the operation to be resumed).

Another aspect pertains to temperature dependency of the light-intensity measurements. Some known photosensitive components, such as photodiodes and phototransistors exhibit no significant temperature dependency. Other photosensitive components, such as light-dependent resistors (LDRs), however, exhibit a significant temperature dependency. For example, electrons in an LDR are not only released by light, but also by heat. Therefore, the resistance of an LDR usually decreases with increasing temperature (in other words, an LDR usually has a negative temperature coefficient). In some embodiments in which the temperature sensors are, for example, based on LDRs, this temperature dependency is temperature-compensated. To this end, the shadow-control system comprises at least one temperature-measurement device, which measures the temperature prevailing at the light sensor(s). In other embodiments the temperature-measurement device is not a part of the shadow control system, but is rather external to the shadow control system; the shadow control system is then arranged to receive a temperature-measurement signal from the external temperature-measurement device. Such an external signal may approximately represent the temperature at the light sensor(s). The light sensor signal(s) is (are) then temperature-compensated, based on the measured temperature. In some embodiments, this temperature compensation is implemented by an analogue circuit at the sensor-component level, so that the signal delivered by the sensor with its temperature-compensation circuit is essentially temperature-independent. In other embodiments temperature-compensation is implemented in a digital manner, e.g. in the form of look-up tables in which temperature-compensation values are stored. A measured temperature and the measured light intensity are the index variables to read out respective temperature-compensated light intensity values, or correction factors to be multiplied by the measured intensity signal, from the look-up table.

Again, the temperature-compensation aspect is advantageous on its own as it increases the reliability of the shut-down and operation-resume decisions. Therefore, this aspect is also claimed in an independent claim which does not include certain particularities of claim 1; for example, it does not include definitions pertaining to the number and orientation of light sensors, or as to whether and how a comparison between different light-intensity measurements are made.

Another aspect pertains to de-icing the light sensors. For example, in winter, ice and snow could cover the active area of the sensor, or a window through which the light can enter the sensor. This could distort the light-intensity measurement. To avoid such distortion, in some embodiments the light sensors are equipped with a heating device arranged to keep the sensor free of ice and snow, when heated. For example, the heating device is dimensioned such that it keeps the sensor surface or window at a minimum of +5° C. when heated.

Again, this measure improves the reliability of the light-intensity measurement and, consequently, the shut-down and operation-resume decisions. Therefore, this aspect is also claimed in a further independent claim that does not contain certain particularities of claim 1, analogous to what was said above in connection with the temperature-compensation of the light sensors.

Returning now to FIG. 1, which is an illustration of the overall situation of shadow 5 cast by a rotor 2 of a wind turbine 1 on the northern hemisphere during a day (the following detailed description applies analogously to a wind turbine installed on the southern hemisphere if the roles of "south" and "north" are interchanged). The sun 3 moves along a path 4 over the horizon during the day. The projection of the rotor 2, seen from the sun 1 at its current position, onto the ground defines the position of shadow 5 cast by the rotor 2. As the sun 3 moves over the horizon, the shadow 5 cast by the rotor 2 will also move; the path of the moving shadow 5 over the ground due to the sun's movement is what is called the shadow path 6. As the sun's position is low in the mornings and evenings (when the sunlight comes from the eastern and western direction, respectively) and is high at noon (when it comes from the southern direction), the path 6 of the shadow 5 on the ground forms a section of an ellipse. The distance D from the turbine 1 to the shadow path 6 is much greater in the east and west directions than the corresponding distance d in the north direction. Three shadow sensitive objects 7 are shown at a distance of approximately D from the turbine 1. The object 7W (eastward the turbine 1) and 7E (westward the turbine 1) are on the shadow path 6 and are therefore subjected to intermittent shadow in the evenings (when the sun is at 3W) or the mornings (when it is at 3E), respectively, while the object 7S (northward the turbine 1) is not hit by any shadow because at noon the rotor's shadow is much closer to the wind turbine 1.

A light sensor set 8 is mounted on a pole 10, positioned, e.g., south of the wind turbine 1. In other embodiments, the light sensor set 8 is directly mounted on the tower 10a of the wind turbine 1 a few meters above ground, where the blades of the rotor 2 cannot cover the light sensors 9E, 9W.

Although only one wind turbine 1 is shown in FIG. 1, often a plurality of wind turbines 1 are grouped together to form a wind park. For each turbine of the wind park a figure analogous to FIG. 1 (with the turbine correspondingly shifted) would have to be drawn. However, certain elements, for example the light sensor set 8, can be used in common for an entire wind park, or a sub-group of wind turbines in a wind park.

Figure 2:
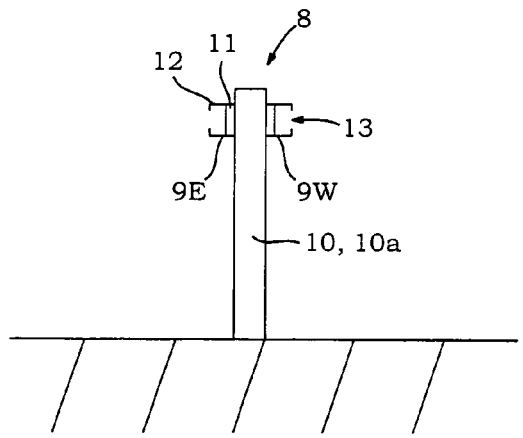
FIG. 2 is a side view of a light-sensor set mounted on a pole.

FIG. 2 shows the light sensor set 8 mounted on the pole 10 in more detail. The set 8 consists of two light sensors 9, an eastward-oriented light sensor 9E and a westward-oriented light sensor 9W. The light sensors 9 have a photosensitive component 11 (e.g. an LDR, a photodiode or a phototransistor) in a sensor housing 12 that has a transparent window 13 opposite to the photosensitive surface of the photosensitive component 11. In other embodiments the mast 10 is actually the lower part of the wind turbine's tower 10a. In some embodiments, the sensors 9E, 9W are slightly tilted in an upward direction. The spectral sensitivity of the sensors 9E, 9W is similar to that of the human eye.

Figure 3:
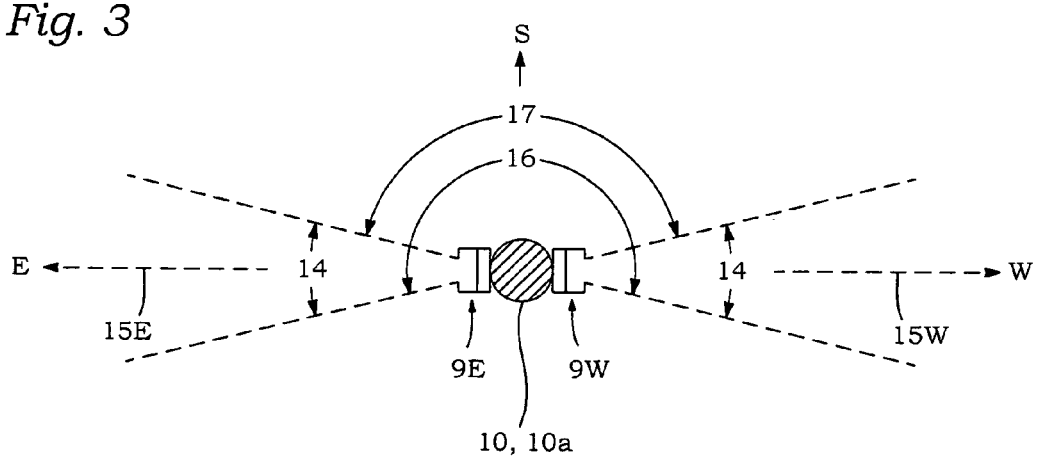
FIG. 3 is a top view of the light-sensor set of FIG. 2.

FIG. 3 is a top view of the light sensor set 8. Each of the light sensors 9 has an aperture angle 14 which, for example, is defined by the size of the window 13 (because the peripheral edge of the window 13 forms an aperture for the light rays hitting the sensor housing 12) the size of the photosensitive surface of the component 11, as well as the distance between the window 13 and the photosensitive surface. For example, the aperture angle 14 may be 30°. The sensor axes 15 are in the middle of the aperture angles 14. In the embodiment of FIG. 3, the sensors 9E, 9W are oriented in the east and west direction, denoted by E and W, respectively. In the alternative embodiment of FIG. 4, the sensors 9E, 9W are turned southward so that the sensor axes 15 have a southward component.

Figure 4:
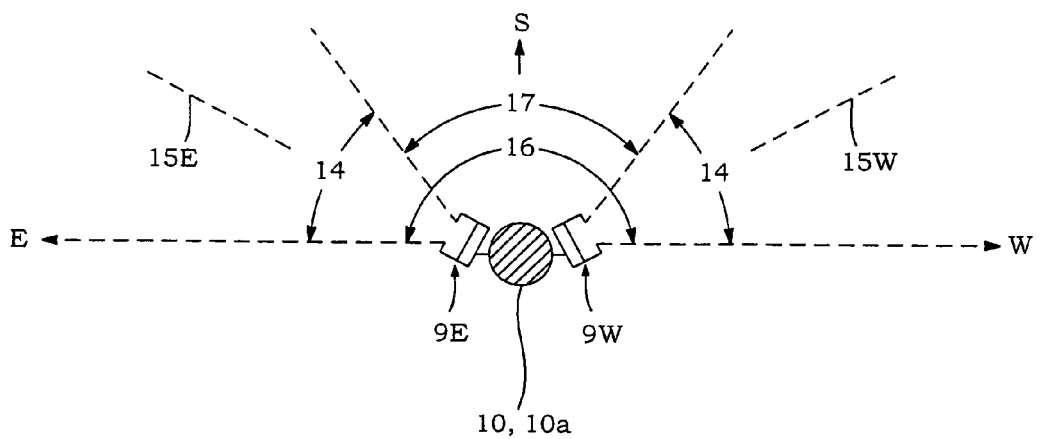
FIG. 4 is a top view of another embodiment similar to FIG. 3, but with a different orientation of the light sensors.

In both the embodiments of FIGS. 3 and 4 the east and west directions are within the aperture angles 14; in FIG. 3, the east and west directions lie at the centre of the aperture angles, whereas in FIG. 4 they are at the aperture angles' periphery.

A virtual "including-south range" 16 can be defined: it starts at the outer boundary of the aperture angle 14 of the eastward-oriented sensor 9E and extends through south to the outer boundary of the aperture angle 14 of the westward-oriented light sensor 9W. It can be seen that, both in FIGS. 3 and 4, the combined aperture angles 14 do not cover the full "including-south range" 16. Rather, a range 17 that is not covered remains, which is about 60° in the example of FIG. 3, and about 30° in the example of FIG. 4 (assuming an exemplary aperture angle 14 of 30°). In other words, the sensor arrangements of FIGS. 3 and 4 would not be able to measure direct-light intensities at noon.

Figure 5:
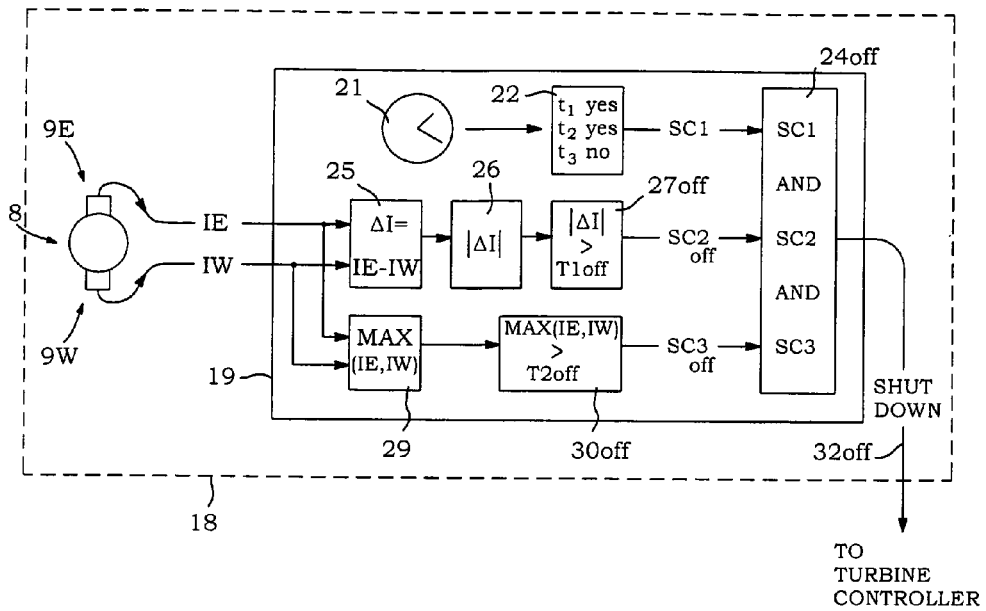
FIG. 5 is a functional diagram of a shadow control system illustrating signal processing up to the generation of a shut-down signal.

FIG. 5 is a functional diagram of a shadow-control system 18 illustrating signal processing up to the generation of a shadow-caused shut-down signal 32 off. It is composed of the light sensor set 8 for producing signals representing measured light intensities (IE, IW) and a shadow controller 19 for processing these signals. The shadow controller 19, for example, is a digital signal processor. However, the modularisation shown in FIG. 5 is only exemplary, since it actually has no particular functional significance. For example, instead of being a separate controller it can be an integrated part of a wind turbine controller that controls the wind turbine's main functions, such as blade pitching, wind tracing of the wind turbine's nacelle, breaking, etc. On the other hand, in some embodiments, some of the functions shown in FIG. 5 as shadow controller functions are performed directly at the light sensor set 8; such functions could, for example, be digitisation of the sensor signals and/or determining certain entities directly based on the measured sensor signals, such as the difference between the intensities measured by the east-ward- and westward-oriented sensors 9E, 9W, and/or the maximum of these two intensities, etc.

The shadow controller 19 has several branches. The first branch is responsible for determining whether shadow 5

(FIG. 1) can theoretically be cast on a shadow-sensitive object 7 (FIG. 1) at the present time of the day. To this end, the shadow controller 19 has a clock 21 (or is arranged to receive a corresponding external clock signal) that outputs the current time of the day. The clock also has a calendar function, i.e. it also outputs the current date of the year (day and month). A table 22 with predetermined content is stored in the shadow controller 19 which indicates, for each short time interval during a year (e.g. time intervals of one minute) whether the wind turbine's rotor 2 (FIG. 1) can theoretically cast shadow 5 on any of the shadow-sensitive objects 7 (FIG. 1) in the vicinity of the turbine 1. The heights and extensions of the objects 7 are also taken into account. The way in which the possibility of occurrence of such shadow is calculated, for example, as described in DE 199 28 048 A1. In other embodiments, the table 22 is not predetermined; rather, the question whether shadow 5 can be cast on a shadow-sensitive object 7 is calculated on the fly, on the basis of the current date and time and stored information about the shadow-sensitive objects' locations, and, if necessary, their heights and extensions (details of such an alternative on-the-fly implementation can also be taken from DE 199 28 048 A1). The output of the clock 21 addresses the table 22, which in turn outputs a logical value (illustrated as yes/no in FIG. 5) that is a first sub-condition 3, SC1. The sub-condition SC1 is input into a logical combiner that determines a shut-down condition 24off.

The second branch of the shadow controller 19 pertains to the processing of the relative light intensity received as an input, the signals IE and IW representing the measured eastward light intensity and westward light intensity from the eastward- and westward-oriented light sensors 9E, 9W. At this stage, it is left open which one of the two light sensors 9E, 9W currently measures the direct-light intensity and which one the indirect-light intensity. This ambiguity is dealt with at the subsequent two stages: at 25, the difference ΔI between the two sensor signals IE and IW is calculated. The result may be negative or positive, depending on which of the two sensors is currently playing the role of the direct-light sensor. At 26, the absolute value of ΔI is calculated; the result |ΔI| is now independent of the role allocation of the sensors. At 27off, a test is made whether |ΔI| is greater than a shut-down threshold for the direct-to-indirect light intensity, T1off (in other embodiments, a test is made whether the absolute value of ΔI is greater than or equal to T1off). The resulting logical signal is the second sub-condition, SC2off, which is also input into the shut-down condition 24off.

The same input signals as supplied to the second branch are also input to the third branch which pertains to processing of the absolute light intensity (without comparison of the direct-light intensity with the indirect-light intensity). As with the second branch, it is left open at the outset which of the two sensor signals IE, IW is the direct-light intensity signal. To this end, at 29, the maximum of IE and IW is determined. At 30off, a test is made whether the maximum is greater (in other embodiments: greater than or equal to) than a second shut-down threshold T2off. The result is a third sub-condition, SC3off, which is input into the shut-down condition 24off.

The shut-down condition 24off forms a logical AND of the three sub-conditions SC1, SC2off and SC3off. The result is a logical shut-down signal 32off. This means that the resulting shut-down signal 32off is TRUE, only if all the three sub-conditions SC1, SC2, SC3 are TRUE. The signal 32off is forwarded to the turbine controller to cause it to shut-down the wind turbine 1.

Figure 6:
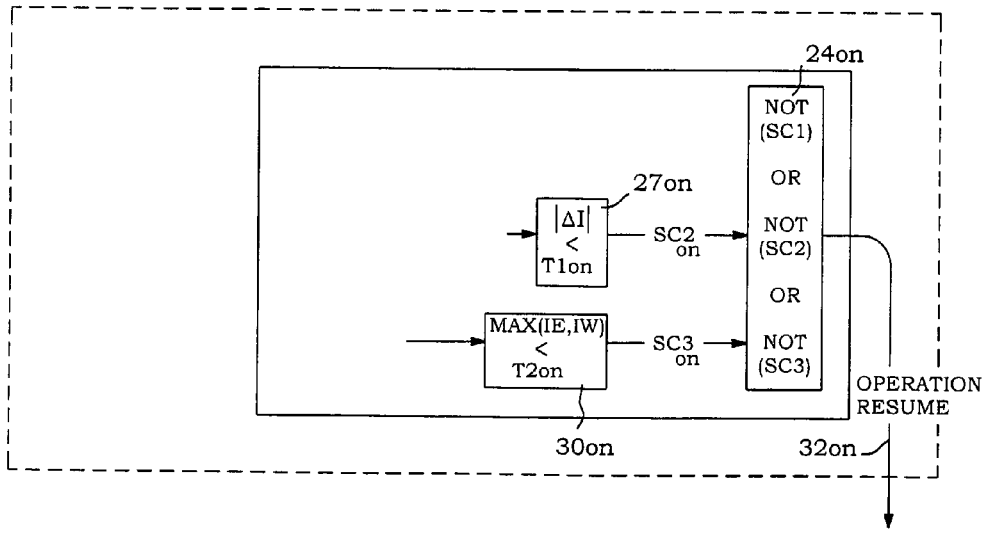
FIG. 6 is a partial functional diagram analogous to FIG. 5, but illustrating the generation of an operation-resume signal.

FIG. 6 is a partial functional diagram illustrating the generation of a shadow-related operation-resume signal. It does not repeat all the elements of FIG. 5, but only shows what is different from FIG. 5.

In the second branch, a test is made at 27on whether the signal coming from 26 (FIG. 5) is smaller than (in some embodiments: smaller than or equal to) a first operation-resume threshold T1on. In the third branch, a test is made at 30on whether the signal coming from 29 (FIG. 5) is smaller than (in some embodiments: smaller than or equal to) a second operation-resume threshold T2on. The resulting sub-conditions SC2on, SC3on (and SC1, as in FIG. 5) are input into an operation-resume condition 24on. At 24on, the negation of each of SC1, SC2on, SC3on is determined, and NOT (SC1), NOT (SC2on), NOT (SC3on) are ORed. This means that the resulting operation resume signal 32on is TRUE, if any one of the sub-conditions SC1, SC2on, SC3on is not TRUE. The operation-resume signal 32on is transmitted to the turbine controller which, in turn, causes the wind turbine to resume operation (of course, operation will only be resumed if there are no other conditions that command the turbine not to operate, such as improper wind conditions, an electrical-grid failure, etc.; in such a case, the wind turbine will not start to operate only on the basis of the operation-resume signal 32on).

Figure 7:
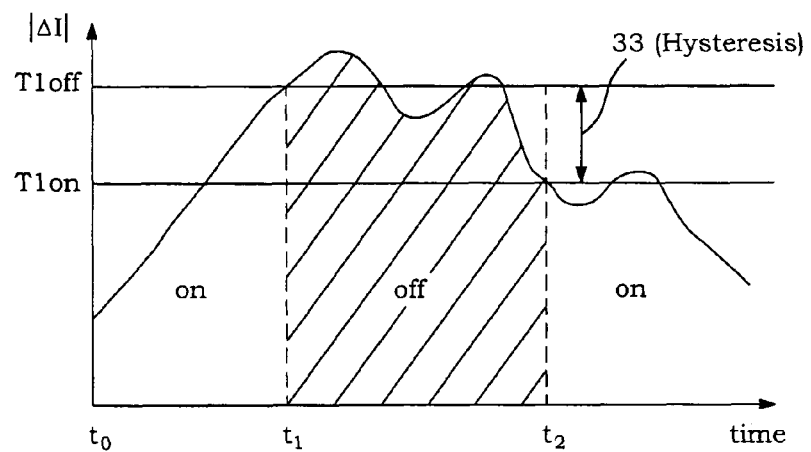
FIG. 7 is a diagram illustrating an embodiment with hysteresis functionality.

FIG. 7 is a diagram illustrating hysteresis functionality in the relative-intensity processing of the second branch. In other embodiments, a similar hysteresis is used in the framework of the absolute-intensity processing in the third branch of FIGS. 5 and 6, in addition to the hysteresis in the second branch; other embodiments with hysteresis only rely on the absolute intensity processing (i.e. they do not have the second branch). FIG. 7 shows an exemplary development of the absolute value |ΔI| of the measured light-intensity difference (calculated at 26 in FIG. 5) versus time. The two thresholds T1off (FIG. 5) and T1on (FIG. 6) are also indicated. It is assumed that the wind turbine is in operation at $t_0$, and that the sub-conditions of the other branches, SC1 and SC3, are TRUE, i.e. that switching on and off the turbine is here only governed by the sub-condition SC2off/SC2on of the second branch.

The operation-resume threshold T1on is below the shut-down threshold T1off; this causes a hysteresis 33 between the shut-down and operation-resume intensities. For example, in FIG. 7, |ΔI| starts to increase from small values below both thresholds and exceeds the operation-resume threshold T1on. This has no effect on the current operational state. Only when |ΔI| exceeds the shut-down threshold T1off (at t1), the shadow-control system 18 causes the wind turbine to be shut-down. Then, after $t_1$, |ΔI| decreases again, and falls below the shut-down threshold T1off again. However, due to the hysteresis 33 this does not cause the shadow-control system 18 to produce the operation-resume signal 32on. Thus, the wind turbine 1 remains inoperative. Only when |ΔI| also falls under the operation-resume threshold T1on (at t2) is the wind turbine started again. In the example of FIG. 7, |ΔI| over- and undershoots the thresholds several times—which would result in a nervous function if it always triggered a corresponding shut-down or operation-resumption action. However, as a consequence of the hysteresis 33, the "nervousness" is calmed and the wind turbine is switched off and on only once.

Figure 8:
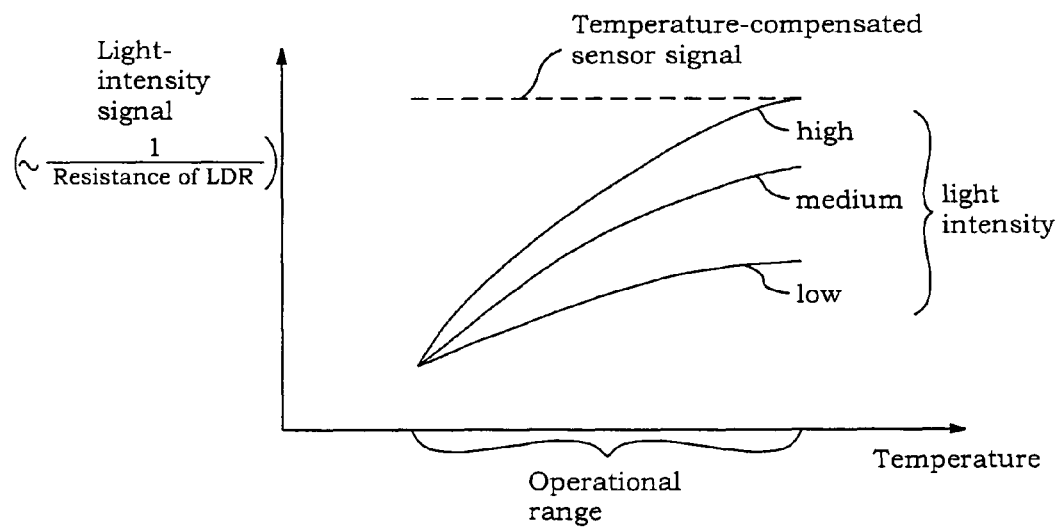
FIG. 8 illustrates a temperature-dependency of a light sensor.

FIG. 8 illustrates the temperature-dependency of the light-intensity signal produced by an exemplary photosensitive component, here an LDR. In FIG. 8, it is assumed that the light-intensity signal is inversely related to the resistance of the LDR. In an LDR, electrons are not only released by light, but can also be released by heat. Thus, the resistance of the LDR decreases with increasing temperature. As a consequence, the light intensity signal is not constant, but increases with the temperature. Moreover, this effect may be more pronounced at low light intensities than at high light intensities, so that a family of curves describes the temperature-dependency of the light-intensity signal, as shown in FIG. 8. However, what is actually desired is a temperature-compensated sensor signal that does not show such temperature dependency, but is constantly shown in FIG. 8 by a dashed line.

Figure 9:
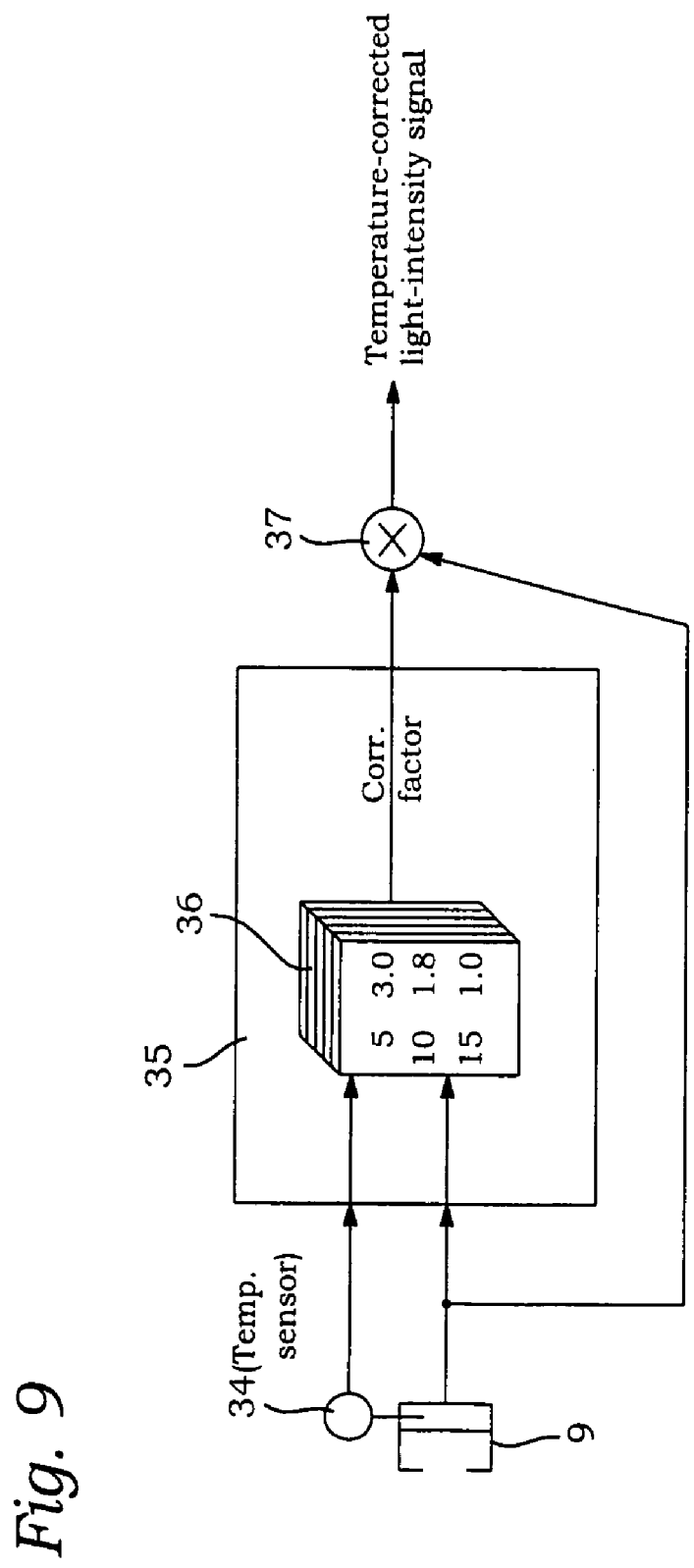
FIG. 9 illustrates an embodiment with temperature compensation of the light intensity measurement.

In some embodiments, corresponding temperature compensation is applied to the light-intensity signal IE, IW from the light sensor(s) 9, an example of which is shown in FIG. 9. To this end, a temperature sensor 34 is provided. For example, the temperature sensor 34 can be in thermal contact with the corresponding light sensor 9. In other embodiments, it is assumed that the light sensor 34 approximately has the ambient air temperature; consequently, the temperature signal can also be provided by an air-temperature sensor that needs not be in thermal contact with the light sensor 9. A temperature compensator 35—which may be an integral part of the shadow controller 19, or may be attached to the light sensor 9, or may be a separate module—receives the temperature signal from 34 and the light intensity signal from the light sensor 9 as inputs. In an exemplary digital implementation shown in FIG. 9, the temperature compensator 35 stores a two-dimensional predetermined table 36 that maps these input values to a compensation factor which, when multiplied by the uncompensated light-intensity signal at 37 provides a temperature-corrected light-intensity signal, as illustrated by the dashed line in FIG. 8. This signal can then be used, for example, as an input signal to the boxes 25 and 29 in FIG. 5.

Figure 10:
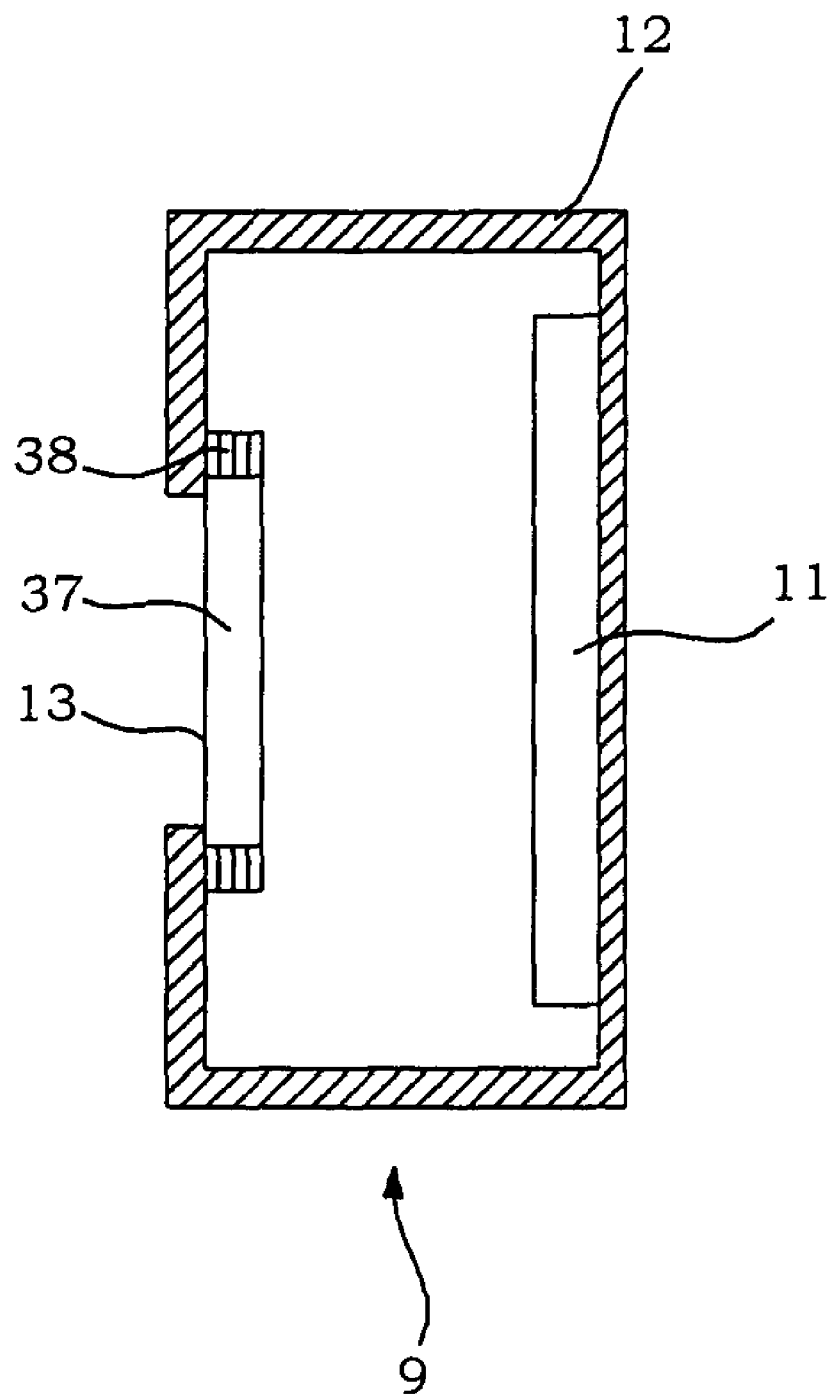
FIG. 10 is a schematic cross-section of an embodiment of a heated light sensor.

FIG. 10 is a schematic cross section of an embodiment of a sensor 9 equipped with a heating to keep the aperture window 13 free of ice and snow. A glass pane 37 covers the aperture window 13 in a light-transparent way. The glass pane 37 is in thermal contact with an electric-resistance heater 38. For example, the heater 38 is arranged at the circumference of the glass pane 37. In other embodiments, electric strip lines are attached to the inner side of the glass pane 37; the width and pitch of the strip lines are sufficiently small so that the transparency of the pane 37 is not significantly reduced. A power supply is provided that is able to supply current with a suitable voltage to the heater 38 so that the temperature of the glass pane 37 can be maintained above, e.g. 5° C. This ensures that ice and snow on the glass pane, which would obstruct the entrance of light to be measured and thereby impair the proper function of the sensor 9 is continuously melted off, so that the aperture window 13 is kept free. In some embodiments, the control of the heater 38 takes the ambient temperature into account. For example, the heater 37 is not supplied if the ambient temperature is above 5° C.

Thus, the embodiments described provide a reliable shadow-control system.

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A shadow-control system of a wind turbine, the wind turbine having a rotor that, when rotating and when the sun is at a certain position, may cast an intermittent shadow onto an object in the vicinity of the turbine, the shadow-control system being arranged to cause the wind turbine to be stopped, based on a shadow-related shut-down condition, so that intermittent shadow is not cast onto the object, wherein the shut-down condition comprises a result of a comparison between a direct-light intensity and an indirect-light intensity being beyond a first direct-to-indirect light threshold, wherein the shadow-control system comprises:

an eastward-oriented light sensor; and
a westward-oriented light sensor, the light sensors provide measured direct- and indirect-light intensities for the comparison, the light sensors being able to measure the direct-light intensity when irradiated by the sun and the indirect-light intensity when not irradiated by the sun, and wherein the shadow-control system has a hysteresis in operation such that a light-measurement result below the first direct-to-indirect light threshold is not sufficient to cause the operation to be resumed.

2. The shadow-control system of claim 1, wherein the light sensors have an aperture angle, and wherein the light sensors are oriented such that the eastern and western directions are within the aperture angle of the eastward-oriented and westward-oriented light sensors, respectively.

3. The shadow-control system of claim 2, wherein the light sensors have an axis with a component in the southward or northward direction.

4. The shadow-control system of claim 3, wherein the axes are oriented symmetrically with respect to the southward direction.

5. The shadow-control system of claim 4, wherein the aperture angle is smaller than 90° and defines an angular range including the southward direction or including the northward direction, and wherein the light sensors are oriented such that their combined apertures do not completely cover the southward direction or the northward direction, respectively.

6. The shadow-control system of claim 2, wherein
the response of the light sensors is temperature-dependent,
the shadow-control system comprises at least one temperature-measurement device, or is arranged to receive a temperature-measurement signal, and
the light-sensor signal is temperature-compensated, based on the measured temperature.

7. The shadow-control system of claim 6, wherein, the at least one light sensor is equipped with a heating device to keep the sensor free of ice.

8. The shadow-control system of claim 1, wherein the light sensors have an axis aligned to east and west.

9. The shadow-control system of claim 1, wherein the light sensors are mounted on a pole.

10. The shadow-control system of claim 1, wherein the shut-down condition further comprises that a result of a direct-light intensity measurement is above a direct-light threshold.

11. The shadow-control system of claim 1, the shadow-control system also being arranged to cause the operation of the wind turbine to be resumed, based on a shadow-related operation-resume condition,
wherein the operation-resume condition comprises the result of the comparison between the direct-light intensity and the indirect-light intensity returning to a second direct-to-indirect light threshold that is less than the first direct-to-indirect light threshold.

12. The shadow-control system of claim 1, wherein
the response of the light sensors is temperature-dependent, the shadow-control-system comprises at least one temperature-measurement device, or is arranged to receive a temperature-measurement result, and the light sensor signals are temperature-compensated, based on the measured temperature.

13. The shadow-control system of claim 1, wherein the light sensors are equipped with a heating device to keep the sensors free of ice.

14. A wind turbine or wind park equipped with a shadow-control system of claim 1.

15. A shadow-control system of a wind turbine, the wind turbine having a rotor that, when rotating and when the sun is at a certain position, may cast an intermittent shadow onto an object in the vicinity of the turbine, the shadow-control system being arranged to cause the wind turbine to be stopped, based on a shadow-related shut-down condition, so that intermittent shadow is not cast onto the object, the shadow-control system also being arranged to cause the operation of the wind turbine to be resumed, based on an shadow-related operation-resume condition, wherein the shut-down condition comprises a light-measurement result being beyond a first threshold, and wherein the operation-resume condition comprises a light-measurement result returning to a second threshold, wherein there is a hysteresis in the thresholds such that the light-measurement result causing shut-down is not sufficient to cause the operation to be resumed.

* * * * *